(12) United States Patent
Kim

(10) Patent No.: US 10,436,387 B2
(45) Date of Patent: Oct. 8, 2019

(54) PRESSURE VESSEL FOR STORING GAS

(71) Applicant: ILSUNG MACHINERY CO., LTD., Gumi-si, Gyeongsangbuk-do (KR)

(72) Inventor: Ki Young Kim, Daegu (KR)

(73) Assignee: ILSUNG MACHINERY CO., LTD., Gumi-si, Gyeongsangbuk-do (KR)

( * ) Notice: Subject to any disclaimer, the term of this patent is extended or adjusted under 35 U.S.C. 154(b) by 27 days.

(21) Appl. No.: 15/982,353

(22) Filed: May 17, 2018

(65) Prior Publication Data
US 2018/0335179 A1 Nov. 22, 2018

(30) Foreign Application Priority Data

May 18, 2017 (KR) .......... 10-2017-0061415

(51) Int. Cl.
F17C 1/00 (2006.01)
F17C 1/06 (2006.01)
F17C 1/12 (2006.01)

(52) U.S. Cl.
CPC .............. *F17C 1/06* (2013.01); *F17C 1/00* (2013.01); *F17C 1/007* (2013.01); *F17C 1/12* (2013.01); *F17C 2201/0109* (2013.01); *F17C 2201/0119* (2013.01); *F17C 2201/0123* (2013.01); *F17C 2201/058* (2013.01); *F17C 2203/0609* (2013.01); *F17C 2203/0619* (2013.01); *F17C 2203/0639* (2013.01); *F17C 2205/0308* (2013.01); *F17C 2209/221* (2013.01); *F17C 2221/012* (2013.01); *F17C 2223/0123* (2013.01); *F17C 2223/035* (2013.01); *F17C 2225/0123* (2013.01); *F17C 2225/036* (2013.01)

(58) Field of Classification Search
CPC .... F17C 1/06; F17C 1/00; F17C 1/007; F17C 1/12; F17C 2201/0109; F17C 2201/0119
USPC .......................................... 220/588
See application file for complete search history.

(56) References Cited

U.S. PATENT DOCUMENTS 2,373,038 A * 4/1945 Lindsay ................ B21D 51/24
29/452

FOREIGN PATENT DOCUMENTS

KR 10-2014-0141839 A 12/2014

* cited by examiner

*Primary Examiner* — King M Chu
(74) *Attorney, Agent, or Firm* — Rabin & Berdo, P.C.

(57) ABSTRACT

Disclosed is a pressure vessel for storing gas. The pressure vessel for storing gas includes a body provided with a hollow portion and configured in a cylindrical shape having a constant thickness along an axial direction thereof; a pair of caps provided with respective injection holes formed through the caps along the axial direction, having threads on an outer circumferential surface thereof, and engaging to both ends of the body to close the body tightly; a flange coupled to each end of the body, the flange having a central opening; and a metal wire wound on an outer surface of the body to strengthen the body. In addition, one end of the wire is fixed on the outer surface of the body by soldering and an opposite end of the wire is fixed on the wire wound on the body by soldering.

10 Claims, 4 Drawing Sheets

PRESSURE VESSEL FOR STORING GAS

CROSS REFERENCE TO RELATED APPLICATION

The present application claims priority to Korean Patent Application No. 10-2017-0061415, filed May 18, 2017, the entire contents of which is incorporated herein for all purposes by this reference.

BACKGROUND OF THE INVENTION

Field of the Invention

The present invention relates generally to a pressure vessel for storing gas. More particularly, the present invention relates to a pressure vessel for storing gas, in which a body of the pressure vessel and a wire for strengthening the body are made of steel to minimize thermal stress, the wire for strengthening the body is fixed to the body or a flange of the pressure vessel by soldering to prevent degradation of the pressure vessel, and an integral flange-cap is fitted over each end of the body to prevent damage of the metal wire.

Description of the Related Art

A pressure vessel for storing gas has been developed continually, and hydrogen has attracted considerable attention as a future energy resource to solve environmental problems with renewable energy due to accelerated use of fossil fuels after industrialization and depletion of oil resources.

Hydrogen stations to commercialize hydrogen as an energy source have been established. Accordingly, development of a high-pressure compressor and a pressure vessel for storing hydrogen is required.

There are four types of pressure vessels for storing hydrogen gas. Types I and II are generally used for storage on the ground, and Types III and IV are used for automobiles.

Particularly, Type II is preferred as a pressure vessel for mounting on the ground because the pressure vessel can be reinforced by impregnating with a reinforcing material such as glass fiber or carbon fiber which is wound around the pressure vessel.

In addition, a pressure vessel of Type II in the related art is deteriorated due to heating at a high temperature applied to the pressure vessel during welding because a metal wire is welded to a body of the pressure vessel to be fixed. Above procedure increases a risk of gas leaks.

Meanwhile, in order to prevent thermal damage of the pressure vessel due to heating at a high temperature, a method of fixing the wire to the body of the pressure vessel with a tape was attempted. However, in the method, it is not possible to provide a sufficient tension in an initial winding process because a fixing force by the tape is weak, so that a rapid winding operation can not be performed.

In addition, the metal wire used as reinforcement for pressure vessels is typically a metal wire of an ultra-fine diameter to reduce gaps between winds of the wire.

However, the fine metal wire wound around the pressure vessel often breaks due to damage during a work process, increasing the degree of risk of the pressure vessel failing.

Therefore, it is urgently required to develop a pressure vessel that prevents thermal damage thereto during a manufacturing process, guarantees the smoothing winding of a wire, and prevents damage to the wound wire.

Documents of Related Art (Patent Document 1) Korean Patent Application Publication No. 10-2014-0141839.

SUMMARY OF THE INVENTION

Accordingly, the present invention has been made keeping in mind the above problems occurring in the related art, and an object of the present invention is to prevent unnecessary thermal damage of the pressure vessel during manufacture to strengthen the pressure vessel.

In addition, another object of the present invention is to prevent damage of a metal wire wound around a body of the pressure vessel.

Furthermore, still another object of the present invention is to prevent sliding of the wound metal wire and to provide a structure of the pressure vessel that supports the wire stably.

In order to achieve the above object, according to one aspect of the present invention, there is provided a pressure vessel for storing gas, the pressure vessel including: a body provided with a hollow portion and configured in a cylindrical shape having a constant thickness along an axial direction thereof; a pair of caps provided with respective injection holes formed through the caps along the axial direction, having threads on an outer circumferential surface thereof, and engaging to both ends of the body to close the body tightly; a flange coupled to each end of the body, the flange having a central opening; and a metal wire wound on an outer surface of the body to strengthen the body, wherein one end of the wire is fixed on the outer surface of the body by soldering and an opposite end of the wire is fixed on the wire wound on the body by soldering.

In addition, according to another aspect of the present invention, there is provided a pressure vessel for storing gas, the pressure vessel including: a body provided with a hollow portion and configured in a cylindrical shape having a constant thickness along an axial direction thereof; a pair of caps provided with respective injection holes formed through the caps along the axial direction, having threads on an outer circumferential surface thereof, and engaging to both ends of the body to close the body tightly; a flange fitted over each end of the body, the flange having a central opening; and a metal wire wound on an outer surface of the body to strengthen the body, wherein a plurality of through holes is formed through the flange, and one end of the wire passes through one of the through holes and is soldered to an outer surface of the flange, thereby being fixed thereon, and an opposite end of the wire passes through a remaining one of the through holes and is soldered to the outer surface of the flange, thereby being fixed thereon.

The body and the wire may be made of steel to minimize thermal stress.

The metal wire may have a diameter in a range of 0.005 mm to 2.5 mm.

A distance from a center of the cap to an outside edge of the flange may be greater than a thickness of the wound wire.

The flange may have a circular or polygonal cross-section.

According to a pressure vessel for storing gas of the present invention, it is possible to prevent thermal damage of the pressure vessel during manufacture, thereby strengthening the pressure vessel.

In addition, according to a pressure vessel for storing gas of the present invention, it is possible to prevent damage of a wound metal wire.

Furthermore, according to a pressure vessel for storing gas of the present invention, it is possible to prevent a sliding of the wound wire and to support the wire stably.

The above described effects and specified effects of the present invention are also described in the following mode for carrying out the present invention.

BRIEF DESCRIPTION OF THE DRAWINGS

The above and other objects, features, and other advantages of the present invention will be more clearly understood from the following detailed description when taken in conjunction with the accompanying drawings, in which.

DETAILED DESCRIPTION OF THE INVENTION

Figure 1:
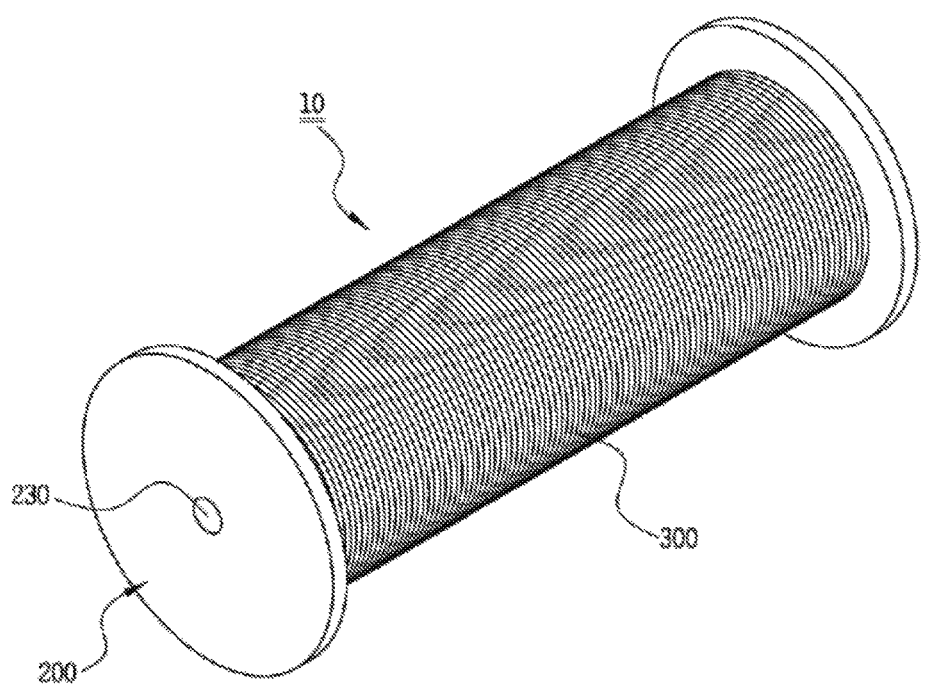
FIG. 1 is a perspective view showing a pressure vessel for storing gas according to a first embodiment of the present invention.

Hereinbelow, to aid in understanding the invention, preferred embodiments of the present invention will be described in detail with reference to the accompanying drawings. It should be understood that the exemplary embodiments according to the concept of the present invention are not limited to the embodiments which will be described hereinbelow with reference to the accompanying drawings, but various modifications, equivalents, additions and substitutions are possible, without departing from the scope and spirit of the invention. Wherever possible, the same reference numerals will be used throughout the drawings and the description to refer to the same or like elements or parts.

It will be understood that, although the terms "first", "second", etc. may be used herein to describe various elements, these elements should not be limited by these terms. These terms are only used to distinguish one element from another element. For instance, a first element discussed below could be termed a second element without departing from the teachings of the present invention. Similarly, the second element could also be termed the first element.

In addition, the terminology used herein is for the purpose of describing particular embodiments only and is not intended to be limiting. As used herein, the singular forms "a", "an", and "the" are intended to include the plural forms as well, unless the context clearly indicates otherwise. In the flowing description, unless otherwise defined, all terms including technical and scientific terms used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein. In some cases, the terms defined herein can not be interpreted to exclude the embodiments of the present invention.

FIG. 1 is a perspective view showing a pressure vessel for storing gas according to a first embodiment of the present invention, and FIG. 2 is sectional views each showing a pressure vessel for storing gas according to the first embodiment of the present invention.

The pressure vessel for storing gas according to the embodiment of the present invention will be described with reference to FIGS. 1 and 2.

The pressure vessel according to the present invention includes a body 100, a pair of caps 200, and a wire 300.

The body 100 is configured to store gas.

The body 100 is provided with a hollow portion 110 therein, and is configured in a cylindrical shape having a constant thickness in an axial direction thereof.

The body 100 is pressurized by high-pressure gas stored in the hollow portion 110. The wire 300, which will be described hereinbelow, is wound on an outer surface of the body 100 to support hoop stress applied to the body 100 by stored high-pressure hydrogen.

The body 100 is made of steel.

The pair of caps 200 tightly closes the body 100.

Each cap 200 is engaged to an end of the body 100.

Each cap 200 is provided with an injection hole 230 at a center thereof to inject gas into the hollow portion 110.

Each cap 200 has threads 240 on an outer circumferential surface thereof.

A pressure vessel in the related art is provided with a narrow opening portion at each end thereof whereby it is difficult to maintain and repair the inside thereof.

In particular, when hydrogen is injected into the pressure vessel, hydrogen-induced cracking occurs in the body 100 due to hydrogen such that there is a risk of hydrogen leakage, therefore, periodic inspection is required.

Accordingly, the present invention employs a cap structure in which the cap 200 is screwed to the body 100 of the pressure vessel, such that a sufficient open space for maintaining is secured and it is easy to fasten and unfasten, thereby facilitating maintenance.

In addition, an end of the pressure vessel in the related art is configured in a dome shape such that large machine for hot drawing is required.

On the other hand, the pressure vessel according to the present invention is configured in a structure in which each end is tightly closed with the cap 200 whereby it is possible to process by general machine tools, thereby facilitating manufacturing.

A flange 210 may be manufactured independently of the cap 200 and fitted over the body 100. On the other hand, the flange 210 may be manufactured integrally with the cap 200 such that it is possible to couple the cap and the body easily and increase a winding area of the wire 300.

The flange 210 supports a side of the wire 300 such that the wire 300 wound on an outer surface of the body 100 maintains a wound structure of the wire 300.

Therefore, a distance from a center of the cap to an outside edge of the flange 210 is configured to be greater than a thickness of the wound wire 300.

Since the distance from the center of the cap to the outside edge of the flange 210 is configured to be greater than the thickness of the wound metal wire 300, it is possible to prevent the thin metal wire 300 from contacting with the ground and from being damaged due to collision with outside objects.

The flange 210 may have a circular or polygonal cross-section.

When the flange 210 has a polygonal cross-section, unintentional rolling movement can be prevented even if placed on the floor.

Figures 2A, 2B:
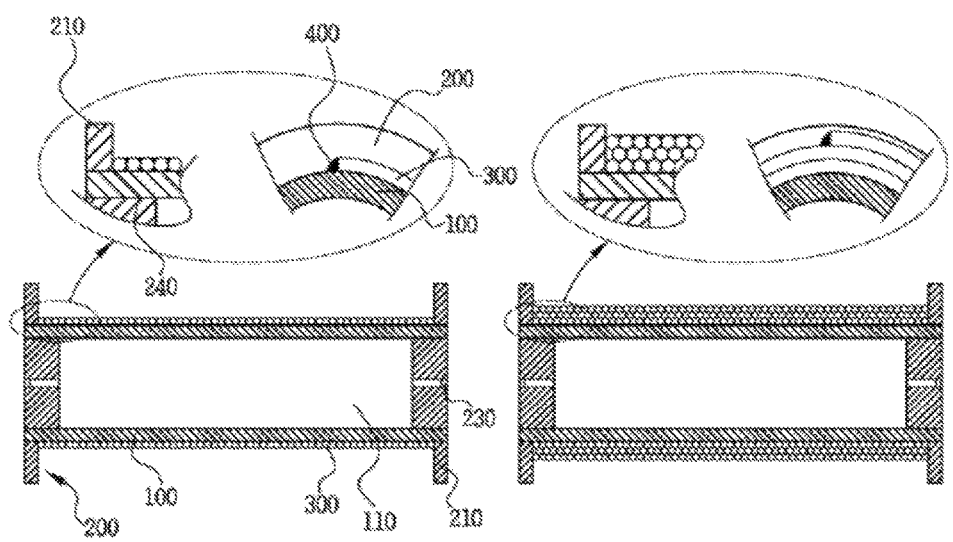
FIGS. 2A and 2B are sectional views each showing a pressure vessel for storing gas according to the first embodiment of the present invention.

FIG. 2A shows a state that the wire 300 is wound on the surface of the body 100 once and FIG. 2B shows a state that the wire 300 is wound on the surface of the body 100 completely.

In the related art, when a wire is welded to a body, a welding rod and the body are exposed to a high temperature, and welding is performed as the welding rod and the body are melted at the high temperature at the same time. At this time, a welded portion of the body is subjected to thermal damage and becomes weak in strength.

Accordingly, in the present invention, a solder joint 400 is formed to fix the wire 300 to the body 100 by soldering. When soldering one end of the wire 300 on the surface of the body 100 to form the solder joint 400, lead is melted but the body 100 is not whereby the solder joint 400 is formed because lead has lower melting point compared with a material of the body 100. The melting point of lead for soldering is 400° C. or less, which is very low, whereby thermal damage to the body 100 can be minimized.

In addition, since the metal wire 300 is thin, the wire 300 is fixed with the solder joint 400 whereby it is possible to provide sufficient tension for winding. Thus, it is possible to quickly wind the wire 300 from the beginning.

An opposite end of the wire 300 is fixed on the wire 300 wound the body 100 due to the solder joint 400. That is, both ends of the wire 300 are fixed by the solder joint 400.

The wire 300 is wound on the outer surface of the body 100 to strengthen the body 100.

If a wire having a large diameter is wound on the body 100, gaps between the winds of the wire are too large to sufficiently support an inner pressure of the pressure vessel. In addition, winding the thick wire consumes larger power. Therefore, winding the metal wire 300 having a small diameter is efficient in decreasing the gaps between the winds of the wire 300 and reducing the power for winding the wire.

The diameter of the metal wire 300 is preferably manufactured in a range of 0.005 mm to 2.5 mm.

The wire 300 is made of steel. By forming the wire from steel, manufacturing cost can be reduced as compared with the case where the wire is made of carbon fiber.

Because the gas stored in the pressure vessel generates considerable heat during compression, when the body 100 and the wire 300 are made of different materials, thermal stress occurs due to a difference in thermal expansion coefficient. Therefore, the body 100 and the wire 300 are made of steel to minimize the thermal stress, thereby improving the life span of the pressure vessel.

Meanwhile, in the related art, resin is applied to a surface of wound wire to fix the wire. However, properties of the resin change as time passes such that structural stability of the pressure vessel deteriorates.

Accordingly, to solve above problems, only the wire made of steel is wound and the both ends of the wire are soldered in the present invention.

Figure 3:
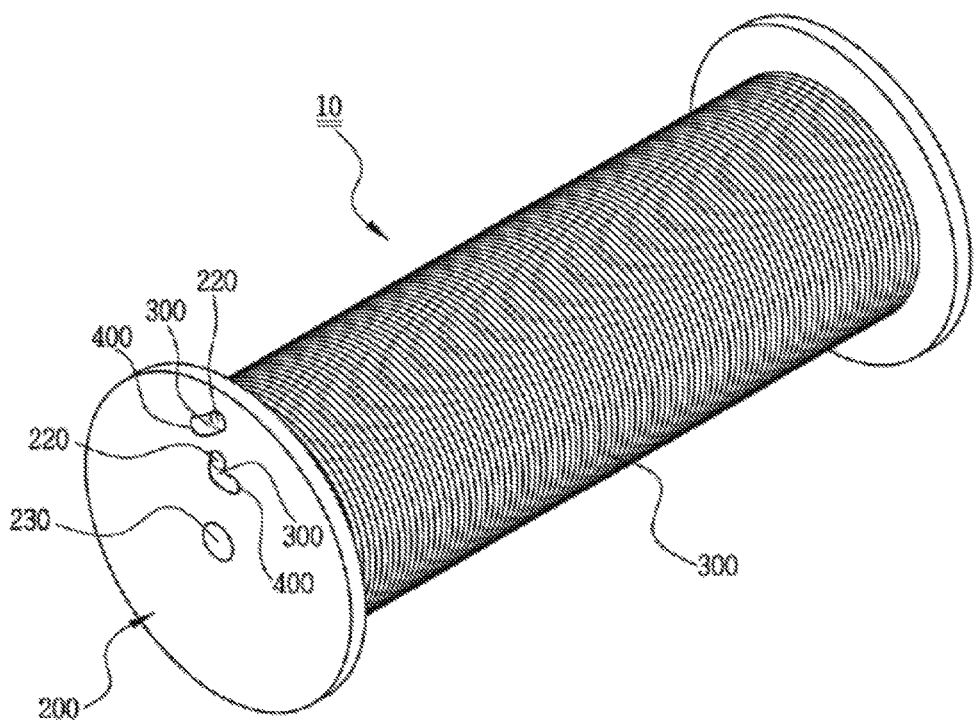
FIG. 3 is a perspective view showing a pressure vessel for storing gas according to a second embodiment of the present invention.
Figure 4:
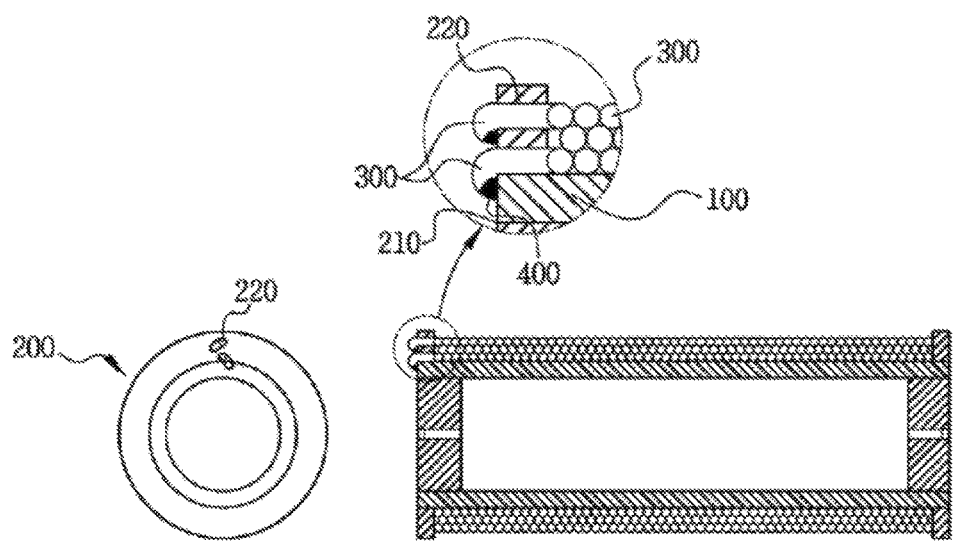
FIG. 4 is a sectional view showing a pressure vessel for storing gas according to the second embodiment of the present invention.

FIG. 3 is a perspective view showing a pressure vessel for storing gas according to a second embodiment of the present invention, and FIG. 4 is a sectional view showing a pressure vessel for storing gas according to the second embodiment of the present invention.

The details will be described with reference to FIGS. 3 and 4. In describing the second embodiment, the description will be made assuming that a different point from the first embodiment is taken as a main point, without explaining all the configurations.

In the second embodiment of the present invention, unlike the first embodiment, soldering is performed on an outer side surface of the flange 210 through a through hole 220 formed through the flange 210, without soldering the one end of the wire 300 to form the solder joint 400 on the surface of the body 100.

Accordingly, soldering on the outer side surface of the flange 210, which is independent of the hoop stress, prevents thermal damage to the body due to soldering.

Not only the one end of the wire but also the opposite end of the wire is not soldered on the wound wire. The opposite end of the wire passes through the through hole 220 formed through the flange 210 and is soldered.

As a result, the flange 210 serves as a support for fixing the wire and as a support for supporting the side of the wire.

Although the preferred embodiment of the present invention have been disclosed for illustrative purposes, those skilled in the art will appreciate that various modifications, additions and substitutions are possible, without departing from the scope and spirit of the invention as disclosed in the accompanying claims. It is thus well known to those skilled in that art that the present invention is not limited to the embodiment disclosed in the detailed description, and the patent right of the present invention should be defined by the scope and spirit of the invention as disclosed in the accompanying claims. Accordingly, it should be understood that the present invention includes various modifications, additions and substitutions without departing from the scope and spirit of the invention as disclosed in the accompanying claims.

What is claimed is:

1. A pressure vessel for storing gas, the pressure vessel comprising:
   a body provided with a hollow portion and configured in a cylindrical shape having a constant thickness along an axial direction thereof;
   a pair of caps provided with respective injection holes formed through the caps along the axial direction, having threads on an outer circumferential surface thereof, and engaging to both ends of the body to close the body tightly;
   a flange coupled to each end of the body, the flange having a central opening; and
   a metal wire wound on an outer surface of the body to strengthen the body,
   wherein one end of the wire is fixed on the outer surface of the body by soldering and an opposite end of the wire is fixed on the wire wound on the body by soldering.

2. A pressure vessel for storing gas, the pressure vessel comprising:
   a body provided with a hollow portion and configured in a cylindrical shape having a constant thickness along an axial direction thereof;
   a pair of caps provided with respective injection holes formed through the caps along the axial direction, having threads on an outer circumferential surface thereof, and engaging to both ends of the body to close the body tightly;
   a flange fitted over each end of the body, the flange having a central opening; and
   a metal wire wound on an outer surface of the body to strengthen the body, wherein a plurality of through holes is formed through the flange, and one end of the wire passes through one of the through holes and is soldered to an outer surface of the flange, thereby being fixed thereon, and an opposite end of the wire passes through a remaining one of the through holes and is soldered to the outer surface of the flange, thereby being fixed thereon.

3. The pressure vessel of claim 1, wherein the body and the wire are made of steel to minimize thermal stress.

4. The pressure vessel of claim 1, wherein the metal wire has a diameter in a range of 0.005 mm to 2.5 mm.

5. The pressure vessel of claim 1, wherein a distance from a center of the cap to an outside edge of the flange is greater than a thickness of the wound wire.

6. The pressure vessel of claim 1, wherein the flange has a circular or polygonal cross-section.

7. The pressure vessel of claim 2, wherein the body and the wire are made of steel to minimize thermal stress.

8. The pressure vessel of claim 2, wherein the metal wire has a diameter in a range of 0.005 mm to 2.5 mm.

9. The pressure vessel of claim 2, wherein a distance from a center of the cap to an outside edge of the flange is greater than a thickness of the wound wire.

10. The pressure vessel of claim 2, wherein the flange has a circular or polygonal cross-section.

* * * * *